United States Patent [19]
Greatline et al.

[11] 3,787,860
[45] Jan. 22, 1974

[54] AIRBORNE NAVIGATION APPARATUS

[75] Inventors: Stanley E. Greatline, Mount Carmel; Fred Leland Grismore, Carbondale, both of Ill.

[73] Assignee: Southern Illinois University Foundation, Carbondale, Ill.

[22] Filed: Oct. 20, 1971

[21] Appl. No.: 190,749

[52] U.S. Cl. .......................... 343/106 R, 340/27 NA
[51] Int. Cl. ............................................. G01s 1/08
[58] Field of Search ................. 343/106 R, 112 PT; 340/27 NA; 324/83 D

[56] References Cited
UNITED STATES PATENTS

| | | | |
|---|---|---|---|
| 3,495,248 | 2/1970 | Raether et al. | 343/106 R |
| 3,653,049 | 3/1972 | Anthony | 343/106 R |
| 3,550,127 | 12/1970 | Hrusovsky | 343/106 R |
| 3,475,754 | 10/1969 | Scovill | 343/112 PT |
| 2,585,565 | 2/1952 | Luck | 343/106 R X |
| 3,663,956 | 5/1972 | Purdy et al. | 324/83 D |
| 3,700,919 | 10/1972 | Stich | 324/83 D |

*Primary Examiner*—Benjamin A. Borchelt
*Assistant Examiner*—Richard E. Berger
*Attorney, Agent, or Firm*—Donald G. Leavitt

[57] ABSTRACT

VOR navigation apparatus is provided with reference and variable phase signals from a received transmission of a VOR station, the phase difference between said signals being proportional to the actual station radial of an aircraft receiving the transmission. The apparatus includes digital phase measurement circuitry for repetitively calculating the digital phase difference between the signals. A solid state display arrangement is responsive to this digital phase difference and has an indicator format which graphically represents the actual radial so as to provide rapid pilot assimilation of aircraft position with respect to the VOR station.

38 Claims, 8 Drawing Figures

3,787,860

Stanley E. Greatline,
Fred Leland Grismore,
Inventors.
Koenig, Senniger,
Powers and Leavitt,
Attorneys.

FIG.3A

AIRBORNE NAVIGATION APPARATUS

BACKGROUND OF THE INVENTION

This invention relates to airborne navigational equipment and more particularly to such equipment adapted to receive vhf omnirange (VOR) signals and to provide indication of the VOR radial on which an aircraft is flying.

Heretofore, airborne VOR navigational equipment typically has employed analog detection and display techniques. In such equipment, reference and bearing signals derived from a received VOR signal are amplified, phase-shifted, and then usually added together in an analog phase sensitive detector. In employing such analog techniques, drift in the circuit element values due to temperature, component aging, vibrations, etc., directly affects and reduces overall accuracy and reliability. For example, errors in radial measurement may be as great as ±4° for the great majority of VOR airborne equipment utilized in the more than one hundred thousand general aviation aircraft. Even the best available equipment, such as used on air carrier aircraft, which number only a few thousand, may have an accuracy no better than typically ±2.5°. Such higher accuracy equipment is relatively expensive.

While digital phase calculation techniques have been proposed, no easily assimilated display of VOR radial information determined through such techniques has been known which is both economically practical and which does not itself introduce errors.

SUMMARY OF THE INVENTION

Among the several objects of the invention may be noted the provision of airborne VOR navigation apparatus and methods; the provision of such apparatus and methods involving digital computation not only of the actual radial on which an aircraft is located, but also the difference between an actual and a desired radial; the provision of such apparatus and methods providing extremely high accuracy in computing and displaying VOR radials; the provision of such apparatus which is not prone to drift in time; the provision of such apparatus which is solid state in design including a solid state display having no moving parts; the provision of such apparatus providing high reliability and which is relatively economically manufactured; the provision of such apparatus incorporating a graphic type of display, representing not only the actual radial on which an aircraft is located but also the desired radial; the provision of such apparatus including a display which is particularly useful in graphically representing radial interception and holding pattern maneuvers; the provision of such a display which can be utilized for providing ILS localizer indication; the provision of such a display providing rapid pilot assimilation of aircraft position; and the provision of such a display which eases pilot workload by eliminating mental steps in interpreting aircraft position. Other objects and features will be in part apparent and in part pointed out hereinafter.

BRIEF DESCRIPTION OF THE DRAWINGS

FIGS. 3A–3C together constitute an overall schematic circuit diagram of the invention, interconnections between these figures being illustrated by the alignment of circuit leads;

Corresponding reference characters indicate corresponding parts throughout the several views of the drawings.

GENERAL DESCRIPTION OF THE PREFERRED EMBODIMENT INCLUDING DISPLAY MEANS

Figure 1:
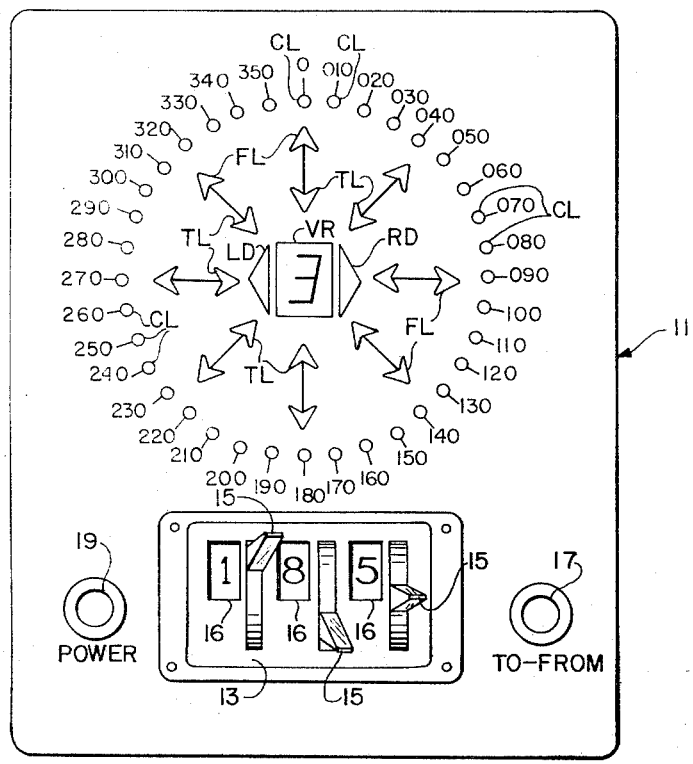
FIG. 1 is a control and display panel of the invention.

Referring now to FIG. 1, a display and control panel of the invention is designated generally 11. The panel includes a plurality of discrete optoelectronic indicators constituted by solid state light-emitting diodes (LED's) which are arranged in a circular format and constitute course indicator lights. These LED's are designated CL and are referred to hereinafter as course lights. The course lights CL are spaced uniformly around the circle to represent, in 10° increments, the radials emanating from a vhf omnidirectional range station or so-called VOR. Indicia provide a legend adjacent each course light CL to indicate the radial represented by the course light, e.g. 0°, 010°, 020°, and so forth through the 350° radial. However, the LED's may be used to illuminate a reticle having the respective radials thereon, and so forth. As will be explained more fully hereinafter, these course lights CL are selectively illuminated to graphically represent the radial nearest but less than the computed radial on which the aircraft is located. This nearest 10° radial is displayed through flashing indication of an appropriate course light CL. Also, the course lights CL are selectively illuminated to indicate the radial nearest but less than a desired radial (i.e., a radial on which it is desired to operate the aircraft) or a radial which it is otherwise desired to have represented. A lever-operated switch register 13 having three selector levers 15 (or thumb wheels or the like) permits the pilot to precisely select the desired radial, which is then indicated at digital readout windows 16. For example, the 185° radial is here shown indicated. A course light CL displaying the nearest 10° radial to that desired is adapted to supply a steady, rather than flashing, indication. The display format provides representation of actual and desired radials in a realistic graphic manner which is rapidly assimilated by the pilot. In addition, the difference between the actual and desired radials is thus also realistically and graphically represented for rapid pilot assimilation.

At the center of the circular arrangement of course lights CL is a seven-segment optoelectronic (LED) display constituting a vernier indicator or readout and designated VR. The vernier readout VR, as will be explained more fully, is adapted to provide numerical vernier indications in 1° increments of the digit least significant of either the actual radial on which the aircraft is located or, when the actual radial is within a predetermined number of degrees from the desired radial, the difference in 1° increments between these two radials. When this latter radial difference is indicated by vernier readout VR, directional indicators LD and RD are adapted to indicate the required direction "left" or "right" in which the aircraft course should be altered for interception of the desired radial. Indicators LD and RD are preferably also optoelectronic indicators (such as LED's). When the vernier readout VR indicates the difference between the actual and desired radials, indicators LD and RD are adapted to be alternatively illuminated to indicate the required direction in which the course of the aircraft should be adjusted or altered for interception of the desired radial. As will be explained more fully, illumination of the left or right directionals LD and RD is controlled by calculations made by the circuitry of the apparatus.

The display includes also a plurality of "to" indicator lights designated TL in the form of arrows pointing toward the center of the display. Similarly, there is a plurality of "from" indicator lights FL which point away from the center of the display. These direction indicator lights TL and FL are preferably constituted by LED's or by other solid state optoelectronic illuminating means. Their operation is controlled by a manually operated switch 17 which is provided with a legend "TO-FROM." Switch 17 can be depressed to selectively choose between energization of either the "to" direction lights TL or the "from" direction lights FL according to determination of whether the aircraft is proceeding generally toward or generally from the VOR station. Switch 17 controls the mode of calculation by the circuitry of the apparatus which determines whether the "left" or "right" direction indicator LD or RD is illuminated whenever the actual radial on which the aircraft is located is within a predetermined number of degrees of the desired radial. Finally, the display and control panel 11 is also preferably provided with a power switch 19 having the legend "POWER" and permitting the apparatus to be switched on or off.

Apparatus of the invention is adapted to be used with a conventional airborne VOR receiver which, when tuned to a predetermined VOR station, supplies a 30-Hz reference phase signal and a 30-Hz variable phase (or bearing) signal. The phase difference between these reference and variable phase signals is proportional to the actual magnetic bearing to the aircraft from the VOR station to which the receiver is tuned, the reference signal being oriented to magnetic north. Thus the actual magnetic bearing defines a radial emanating from the station and passing through the aircraft. I.e., the phase difference between the reference and variable phase represents the actual radial from the VOR station of from 0° to 360° with respect to magnetic north. The use of conventional superheterodyne techniques or the like to detect the 30-Hz reference and variable phase signals is well known and forms no part of this invention.

Figure 2:
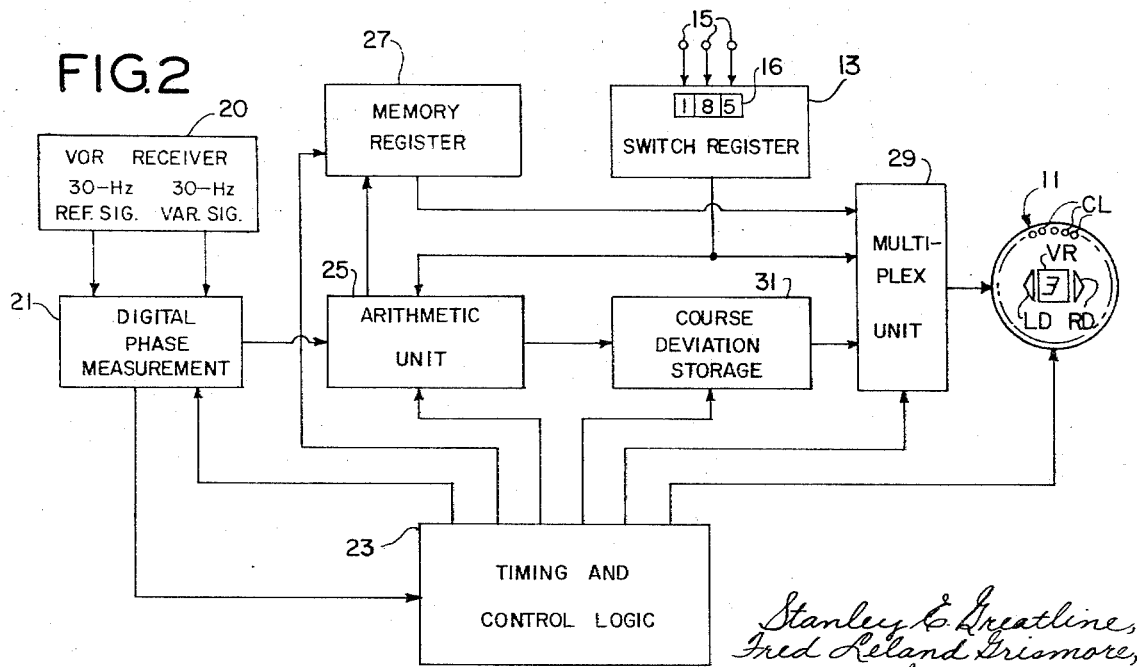
FIG. 2 is a block diagram schematically illustrating circuitry of the invention.

Referring to FIG. 2, which is a block diagram of the apparatus, the 30-Hz reference and variable phase signals are provided from the conventional VOR receiver 20 to digital phase measurement circuitry of the invention, designated 21. In conjunction with certain timing and control logic circuitry 23, a first, or radial measurement, phase of operation of the apparatus is carried out during which the phase measurement circuitry 21 compares the 30-Hz reference and variable signals and provides a digital measurement of the phase difference between the reference and variable signals by gating a pulse train (the variable signal lagging behind the reference signal by an amount proportional to the actual radial in degrees referenced to magnetic north). The number of such pulses is counted and accumulated by an accumulator of an arithmetic unit 25. The two more significant (e.g., hundreds and tens) digits of the accumulated count are transferred to a memory register 27 and these more significant digits are subsequently displayed, through operation of a multiplex unit 29, by flashing illumination of one of the course lights CL to indicate the radial nearest to but less than the actual radial.

The apparatus now carries out a second phase of operation during which the number previously counted by arithmetic unit 25 (and now effectively stored in memory register 27) is compared with the desired radial selected by switch register 13 and displayed by the readout 16 thereof. This comparison or calculation between the stored number and a number representative of the desired radial is made by arithmetic unit 25 under the control of timing and control logic 23. During this comparison, or so-called course correction phase of operation, a determination is made whether the radial measured is within a predetermined difference of ±9° of the desired heading stored in switch register 13. If it is not, the least significant digit (i.e., the digit representing units) previously stored in the accumulator of arithmetic unit 25 is caused to be displayed (through operation of multiplex unit 29) by the vernier readout VR of the display and control panel 11. Meanwhile, multiplex unit 29 causes steady illumination of one of the course lights CL to indicate the two most significant digits of the desired radial, i.e., the nearest ten degrees less than this desired radial.

However, if the measured radial stored in the accumulator is within ±9° of the desired radial, this difference is stored by a counter of course deviation storage circuitry 31. The latter, in conjunction with multiplex unit 29, causes display by vernier readout VR of this difference. Also, if the difference is other than zero, a selected one of the left and right direction-indicating wedges LD and RD is illuminated to indicate whether the desired radial is to the left or the right of the actual radial. This condition which exists when the calculated radial is within ±9° of the desired radial is also indicated by convergence of the flashing course light CL with the steadily illuminated course light CL so that only this single steadily illuminated course light remains visible.

SPECIFIC DESCRIPTION OF CIRCUITRY OF THE PREFERRED EMBODIMENT

Figure 3A:
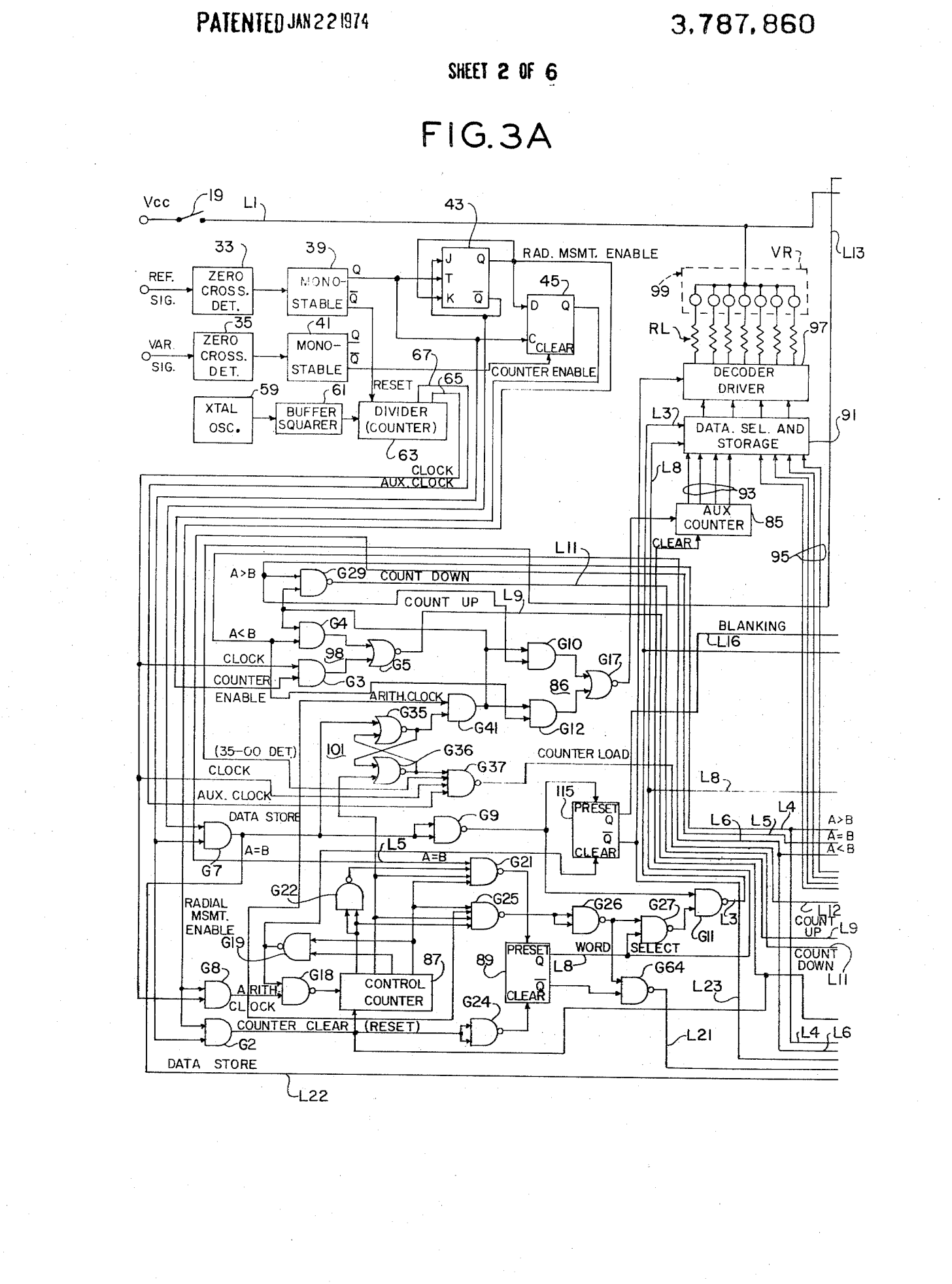

Referring now to FIG. 3A, a supply voltage Vcc is supplied to circuitry of the apparatus via a lead L1 with respect to ground. Positive logic is assumed throughout the explanation of the circuitry. The digital phase measurement circuitry 21 (FIG. 2) includes a first zero crossing detector 33 and a second such detector 35 to which the reference and variable phase signals are respectively supplied from a conventional VOR receiver. The purpose of detectors 33 and 35 is to respectively identify the beginning of the cycle of each of the reference and variable signals.

Figure 4:
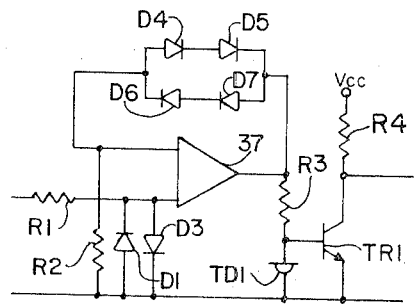
FIG. 4 is a schematic circuit diagram of a certain zero crossing detector circuitry of FIG. 3A.

Each such zero crossing detector 33 and 35 includes circuitry shown in FIG. 4 and including an input amplifier portion comprising a monolithic integrated circuit differential operational amplifier 37 having an input to which the respective input signal is provided through a resistor R1 and across which are connected clipping diodes D1 and D3. A bidirectional diode feedback network for precisely controlling the gain of the amplifier includes diodes D4–D7 connected between the output and other input of amplifier 37. This network includes resistor R2 connected between the latter input and the signal ground. Another portion of the circuit includes an NPN transistor TR1 having its base connected through a resistor R3 to the output of amplifier 37. A tunnel diode TD1 is connected between the base and the emitter terminals of the transistor such that a hybrid switching circuit is provided which acts as a level detector. Transistor TR1 is given a forward bias when tunnel diode TD1 is driven into its conductive state. The output from the circuit is supplied across a load resistor R4.

Referring again to FIG. 3A, the output signals from detector circuits 33 and 35 are each supplied to respective monostable or one-shot multivibrators 39 and 41 each having so-called Q and $\overline{Q}$ outputs as indicated. When the reference signal is zero-valued, zero crossing detector 33 provides an input to multivibrator 39. The Q output of multivibrator 39 thus supplies a narrow pulse to the clock or toggle input of a J–K master-slave flip-flop 43 which is connected to operate as a modulo-two counter, changing states each time the toggle input goes negative. The Q output of flip-flop 43 provides a signal for enabling the radial measurement phase of operation. Thus, when the Q output of flip-flop 43 is low, the radial measurement phase of operation occurs and, when high, a course correction or comparison phase of operation can occur.

The radial enable signal and the ouput signal from the reference channel multivibrator 33 are supplied to a two-input AND gate G2 whose output is adapted to supply a pluse serving as a counter clear or reset command which is used to clear and reset all of the counters and delays (described hereinbelow) in order to prepare for a new radial measurement cycle. Thus, this counter clear command signal is used for master synchronization.

During the generation of the counter clear signal, the positive signal from the Q output of flip-flop 43 is also supplied to the so-called D input of a D-type flip-flop 45. Its clocking or C input is provided with the Q output signal of multivibrator 39. The operation of flip-flop 45 is such that the signal present at its D input is transferred to its Q output on the positive-going edge of the clocking signal at the C input. In this way a counter enable signal is stored at the beginning of the counter clear pulse in order to prevent any "race" problems that might occur if the clocking signal and the radial measurement enable signal were both to change at the same time.

A main counter register, or accumulator, of the arithmetic unit comprises three integrated circuit, four-bit, up-down binary coded decimal (BCD) counters 47, 49 and 51 (FIG. 3B), each representing one decade. Respective parallel inputs 53, 55 and 57, which are either grounded or connected to the supply voltage VCC as indicated, are used for a purpose explained later. The counters and other integrated circuit devices employed in the apparatus are preferably of the transistor-transistor logic (TTL) type and it should be noted that, as described herein, logic gates or other digital devices of this class whose output is a logical function of the input thereto are said to supply an output signal or to be supplied with an input signal when the respective output or input is at a distinct "high" level or 1 state as opposed to a "low" level or 0 state.

A string of pulses for causing counting by counters 47, 49 and 51 of the accumulator during the radial measurement phase are provided by circuitry (FIG. 3) including a crystal oscillator 59, a buffer circuit 61 and a frequency divider 63 which constitutes digital means for dividing the output frequency of oscillator 59 by a factor to provide pulses of a pulse repetition period corresponding to a predetermined interval of radial measurement. The pulses serve to provide time increments each equivalent to one degree of radial bearing measurement. For this purpose the frequency of oscillator 59 is chosen to be 172.8 kHz. The conventional buffer 61 "squares" the sinusoidal output signal from oscillator 59 to provide well-defined pulses to divider 63. The latter is constituted by a four-bit binary "ripple" counter connected to divide its input frequency by a factor of sixteen thereby to provide an output frequency of 10.8 kHz. Thus pulses are provided of a pulse repetition period corresponding to one degree of radial measurement.

The Q output of multivibrator 39 is connected to the so-called load input of divider or counter 63 so as to cause the latter to be reset at the beginning of each cycle of the reference signal thereby to correct for drift and minimize jitter. By this means, stable and accurate clock synchronization is achieved with oscillator 59 and buffer squarer 61 constituting means for synchronizing the operation of the counter (divider) 63 with the reference signal. Counter 63 is connected so that it has the binary number seven wired into its input register. Accordingly, when the load input goes low, the number seven will be transferred to the output, designated 65. The period of multivibrator 39 is adjusted to equal exactly seven cycles of the output signal of oscillator 59. Accordingly, upon release (reset) of counter 63, the clock pulses for the apparatus are synchronized to within one-sixteenth of one degree. Counter 63 includes another output 67 providing twice the frequency of output 65 and this provides an auxiliary clock signal for purposes explained later. It will be understood that for even greater timing precision, a phase-locked loop could be used in place of the above-described arrangement for the generation of clock pulses.

A pair of two-input AND gates G3 and G4 have their outputs connected to a two-input NOR gate G5 to provide an AND-OR-INVERT function. The output of gate G5 is interconnected with the main register counters 47, 49 and 51 to provide a count up signal for the counters. The main clock and counter enable signals are provided to the two inputs of gate G3 and, when present, cause gate G5 to provide this count up signal, causing the counters to accumulate one count for each clock pulse until the counter enable signal is terminated upon flip-flop 45 being cleared. The resultant total count represents the actual VOR radial on which the aircraft is located.

The other signals which are generated by circuitry of FIG. 3A and whose use is explained later may be presently considered. These are a data store signal and an arithmetic clock signal. A two-input AND gate G7 is connected for being supplied with the $\overline{Q}$ output signal (the complement of the radial measurement enable signal) of flip-flop 43 and with the Q output signal from multivibrator 39. When the latter two signals are provided, gate G7 delivers the data store signal which identifies the beginning of a course correction sequence of operation and also serves as a course correction initiation command.

The arithmetic clock signal constitutes a string of pulses for digitally incrementing the main register (counters 47-51) during the course correction sequence and is generated by a two-input AND gate G8 which is connected for receiving the radial measurement enable and main clock signals. Since the measurement enable signal is predominantly positive during the course correction cycle, the output of gate G8 provides a series of pulses in synchronism with the main clock only during this cycle.

Figure 3B:
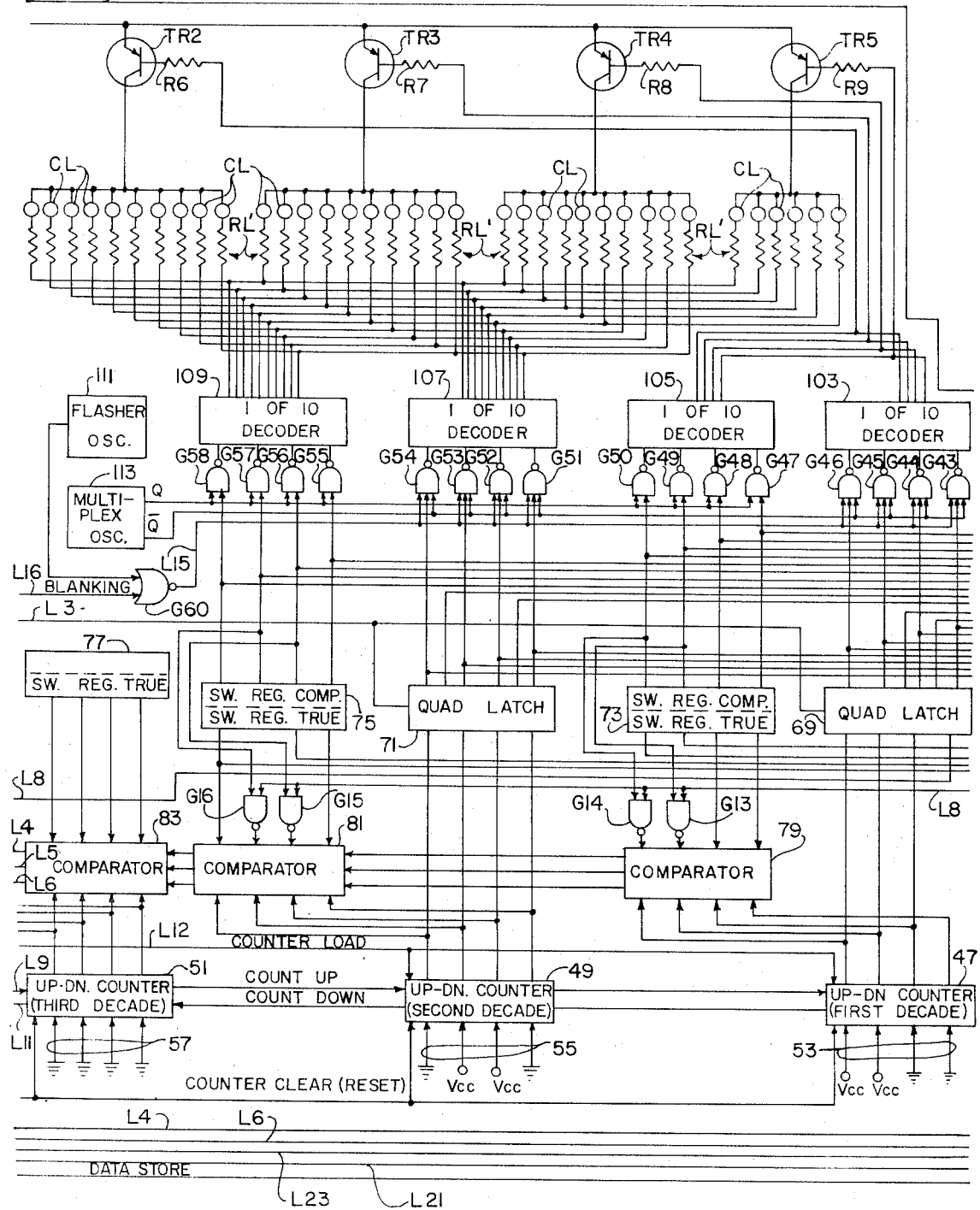

The two most significant digits of the number in the accumulator (or main register) are those represented by counters 53 and 55. These two digits, in binary coded decimal (BCD) form, are stored in response to the data store signal for use during the course correction sequence by respective integrated circuit quad latch circuits 69 and 71 (FIG. 3B). The data store signal is supplied to these two quad latches from gate G7 by circuitry (FIG. 3A) including a NAND gate G9 and a further NAND gate G11 via a lead L3. The digits stored in these latches are then decoded and displayed by illumination of one of the course lights CL as is explained later. The least significant digit is stored by a storage module 91 in response to the data store signal. Hence the accumulator is freed for other purposes. Quad latches 69 and 71 and storage module 91 serve as memory register 27 of FIG. 2.

During the course correction phase of operation, with which the circuitry whose description follows is mainly concerned, the number counted by the accumulator (counters 47, 49 and 51) is compared with the number selected by switch register 13. The three digits of switch register 13 are represented in FIG. 3B as three BCD sections 73, 75 and 77, each corresponding to a respective one of the counters. Switch register 13 is of the type which represents in BCD form both the actual or "true" digits of the number selected and the complements of these digits. The true digits are compared with the digits in counters 47, 49 and 51 by means of respective integrated circuit BCD comparators 79, 81 and 83. Two-input NAND gates G13-G16 connected in certain of the leads between switch section 73 and comparator 79 and between switch section 75 and comparator 81 are for a purpose explained later. These three comparators are interconnected as shown to provide three output leads L4, L5 and L6 signalling respectively whether the number counted by the main register counters is greater than, equal to, or less than the number selected by means of sections 73-77 of switch register 13. These three relationships between the two numbers may be represented by A>B, A = B, and A<B.

Under the control of logic circuitry whose description follows, the count in counters 47-51 is advanced incrementally by the arithmetic clock signal if A>B, or retarded by the arithmetic clock signal if A<B, until A = B. The purpose of this null-seeking means in equating the number in the accumulator to the in switch register 13 is to determine the deviation of the actual radial from the desired radial. The number of pulses, or counts, necessary to make A = B is recorded, i.e., counted by a four-bit binary counter 85 which may be referred to as the auxiliary counter. Auxiliary counter 85 (FIG. 3A) stores a number which, if the actual radial (i.e., the initial count in counters 47-51) is within ±9° of the desired radial selected by switch register 13, is displayed by vernier readout VR. Delivery of the arithmetic clock signal to circuit 87 for advancing its count during incrementing of the accumulator is controlled by an AND-OR-INVERT gate 86 constituted by two AND gates G10 and G12 and a NOR gate G17.

Determination of whether greater or fewer than nine counts (representing ±9°) were required to increment the counters 47-51 to make A = B is carried out by a control counter 87 (FIG. 3A) constituted by a further four-bit binary counter. The arithmetic clock signal is supplied to control counter 87 for advancing its count when permitted by a two-input NAND gate G18 and a further two-input NAND gate G19 having its two inputs connected with a pair of the outputs of counter 87. A four-input NAND gate G21 has these inputs interconnected with the outputs (one of these through an inverting, or NAND, gate G22) of control counter 87 for the purpose of decoding a count of ten in control counter 87. Lead L5, which signals A = B, provides the fourth input to gate G21. If A = B, upon decoding the tenth count in control counter 87, gate G21 provides an output signal which presets an RS (set-reset) flip-flop 89 so that the Q output thereof provides a so-called word select command signal via a lead L8. This flip-flop thereby stores the word select command. Clearing of flip-flop 89 is provided by a NAND gate G24 whose inputs are supplied with the counter clear (reset) signal.

The output of gate G21 provides a command to change display modes as the following explains. Interconnected with the outputs of both counter 47 and auxiliary counter 85 is a conventional integrated circuit data select and storage module 91. Upon the word select command (i.e., when lead L8 goes high) module 91 is caused to select the BCD number provided by the outputs (collectively designated 93) from auxiliary counter 85 in preference to the number provided by the outputs (collectively designated 95) from counter 47 and stored by module 91 prior to incrementing of the accumulator counters. When a data store signal on lead L3 is also provided thereto, module 91 delivers at its outputs the selected BCD count in auxiliary counter 85. This BCD count represents the difference in degrees (when less than ten) between the actual and desired radials. An integrated circuit seven-segment decoder-driver module 97 decodes this BCD output from module 91 and drives individual ones of the seven light-emitting segments 99 of vernier readout VR through respective current-limiting resistors RL.

Gate G11, which supplies the data store input to module 91, has one input interconnected with circuitry including a four-input NAND gate G25 connected as a decoder for control counter 87 and two further NAND gates G26 and G26. NAND gate G25 decodes the eleventh state of control counter 87. Gate G27, by virtue of logic duality, performs as a logic OR gate. If A = B does not occur within nine incrementing pulses, then a data store command is effectively supplied by gate G11 via lead L3 to module 91 which causes the BCD output data now stored in module 91 (from counter 61 prior to accumulator incrementing) to appear at the output of modue 91. Module 97 decodes this BCD number and drives vernier readout VR so as to display the number in decimal form. This number is the least significant digit of the accumulator and indicates the last digit of the actual radial, i.e., the nearest one degree.

The circuitry which controls the incrementing of the accumulator so as to produce the A = B relationship may be regarded as a null-seeking arrangement and includes the comparators 79, 81 and 83 and gates G3–G5 which together form an AND-OR-INVERT gate 98. If comparators 79, 81 and 83 determine that A>B, then lead L4 goes high, causing the output gate G5 to deliver a count up signal to the accumulator via a lead L9. If there is an A<B signal on lead L6, then a two-input NAND gate G29 (acting as an OR gate) provides a count down signal at its output on a lead L11. If the number in the accumulator equals that determined by the switch register, i.e., A = B, then neither the A>B and A<B signals are provided and incrementing of the accumulator stops.

In order to eliminate any difficulty which could result from the mathematical discontinuity which exists between actual radials from 359° to 0°, it is necessary to prevent the counters of the accumulator from being incremented past a count of 359°. Such prevention is effected by discontinuity compensating means. In order to prevent an erroneous and impossible null-seeking operation (A = B) from taking place, a discontinuity test is made by this discontinuity compensating means to determine whether or not the count stored in the accumulator during the radial measurement phase is within ±10° of 360° (i.e., 0°).

This discontinuity situation may occur where the desired radial (selected by the switch register) is between 0° and 10°, and the actual radial is between 350° and 360° (0°). This latter situation is detected by an eight-input NAND gate G31 (FIG. 3C) connected to the complement outputs of the two most significant decades of the switch register (switch sections 73 and 75) to decode a zero from each of these decades. A similar eight-input NAND gate G32 (FIG. 3C) is connected to the two most significant decades of the memory register (quad latches 69 and 71). The outputs of these gates G31 and G32 are respectively connected to the two inputs of a NOR gate G33 to decode respective BCD counts of "3" and "5" of these quad latches.

The output of gate G33 goes high if the desired radial is between 0° and 10° and the actual radial is between 350° and 360°, one of the two possible discontinuity situations. To remove the discontinuity, the numbers 3 and 6 are injected between the two most significant decoders of the switch register (sections 73 and 75) and the comparator (modules 79 and 81) by gates G13–G16 (operating as OR gates) when a signal is delivered thereto by a logic inverting NAND gate G34 interconnected between gate G33 and one lead of each of gates G13–G16. This causes these comparators to interpret the desired leading as between 360° and 370° rather than between 0° and 10°.

The other situation presenting a discontinuity problem exists whenever the two most significant digits of the accumulator are 0 and 0 and those of the switch register are 3 and 5. To move this discontinuity out of range during incrementing of the accumulator, the numbers 3 and 6 are transferred to counters 47 and 49 by parallel inputs 53 and 55 when a so-called counter load signal is applied thereto by a lead L12.

Circuitry (see FIG. 3A) for generating the counter load signal includes an RS flip-flop 101 constituted by a pair of cross-connected two-input NOR gates G35 and G36. The data store signal from gate G7 causes setting of flip-flop 101 at the beginning of the course correction cycle. The Q output of flip-flop 101 drives one input of a four-input NAND gate G37. The clock and auxiliary clock signals are provided to two others of the inputs, and the fourth input is provided by a lead L13 connected to the output of a two-input NOR gate G38 (FIG. 3C) corresponding to gate G33. Two eight-input NAND gates G39 and G40 are respectively connected to the two most significant decades of the memory register (latches 69 and 71) and of the switch register (sections 73 and 75). Gate G38 provides an output signal via lead L13 to gate G37 whenever the significant digits of the accumulator (and thus the latches) are 0 – 0 and those of the switch register are 3 – 5. Flip-flop 101, it will be noted, effectively retains the data store command. Thus, following the data store command, the concurrent presence of the output signal on lead L13 from gate G37 with the clock and auxiliary clock signals will cause a counter load signal from gate G37. The second bit position output from control counter 87 is used to reset flip-flop 101 following generation of the word select command. In its reset condition, flip-flop 101 permits the arithmetic clock signal to be delivered by an AND gate G41 to the AND-OR-INVERT gate 86 which controls the advancing of the count of auxiliary counter 85.

Circuitry for causing display by panel 11 of the desired and the repetitively computed, or actual, radials may now be considered. The course lights CL, each being of the commercially available gallium arsenide type of LED, are connected in four groups of several LED's each, the anodes of all those LED's of each group being connected through the collector of a respective one of four PNP transistors TR2–TR5. Each such LED constituting a course light CL represents a 10° radial bearing measurement increment. Since the first three groups (from the left of FIG. 3B) have ten LED's each, each of these first three groups (controlled by transistors TR2–TR4) represents 100° of radial bearing measurement, totalling 300°. A fourth group of six LED's controlled by transistor TR5 represents the remaining 60° of bearing measurement.

Drive signals for transistors TR2–TR5 are supplied through respective resistors R6–R10 from one of two BCD-to-decimal (or so-called one-out-of-ten) decoders 103 and 105. Only four of the ten possible outputs of decoders 103 and 105 are connected, of course. Modules 103 and 105 are of the type permitting corresponding individual ones of these outputs to be tied together in "wired-OR" configuration as shown.

The opposite sides of the LED course lights CL are similarly connected through current-limiting resistors RL' to respective ones of the ten outputs of each of two additional one-out-of-ten decoders 107 and 109, and these outputs are also interconnected in "wired-OR" configuration. Connected to the BCD inputs of each of decoders 103, 105, 107 and 109 are respective NAND gates G43–G58. Gates G43–G46 and G51–G54 are of the three-input type and the remaining ones of these NAND gates are of the two-input type. Gates G43–G58 are adapted to control the application to the inputs of decoders 103, 105, 107 and 109 of the BCD numbers selected by switch register sections 73 and 75 and stored by latches 69 and 71.

Gates G43–G46 and G51–G54 prevent decoding of the digits stored by latch 69 and 71, respectively, when an inhibit signal is applied to the latter light gates by a lead L15. This inhibit signal may be periodic in character through operation of a flasher oscillator 111 and a NOR gate G60. Oscillator 111 is of suitable conventional design, such as a multivibrator oscillating at a rate such as about 2 Hz. The inhibit signal is also momentarily produced by a blanking signal delivered by a lead L16 to NOR gate G60. Oscillator 111 causes flashing illumination of that course light CL which indicates the actual (i.e., computed) radial.

A so-called multiplex oscillator 113 operating at a frequency of about 500 Hz, for example, and having out-of-phase outputs (such as a multivibrator), causes multiplexed energization of two of the course lights CL so as to indicate both desired and actual radials. For this purpose, one output (Q) of oscillator 113 is connected to inputs of gates G47–G50 and G55–G58 while its out-of-phase output $\overline{Q}$ is interconnected with inputs of gates G43–G46 and G51–G54. Hence, oscillator 113 permits the decoders, unless blanked, to switch alternately between energization of the course light CL indicating the actual radial, but at a switching rate not detectable by the eye. In this way, the two (desired and actual) sets of BCD information for the display are switched alternately to the decoders in a time-sharing arrangement.

The blanking signal supplied by lead L16 for inhibiting energization of one of the course lights CL is necessary to prevent unwanted signals from being displayed by the display during the course correction cycle. The blanking signal is effectively provided by an RS flip-flop 115 (FIG. 3A) whose state is changed in response to the data store signal delivered from gate G7 and inverted by NAND gate G9. When preset, flip-flop 115 causes blanking of the LED display. Flip-flop 115 is cleared when the twelfth count of control counter 87 is decoded by a two-input NAND gate G19. Hence, blanking of the course lights CL is initiated when the count is stored (data storing) in the memory register and continues until the course correction arithmetic has been carried out.

Figure 3C:
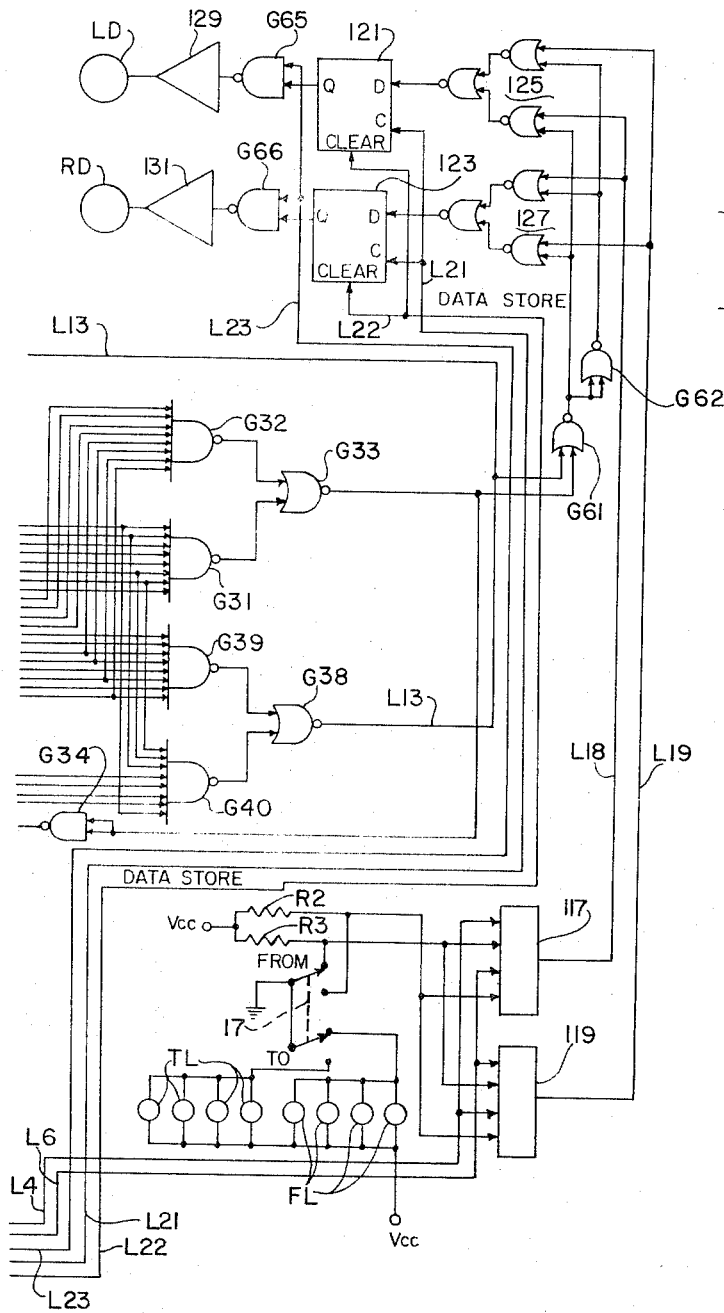

The left and right direction indicators LD and RD are shown in FIG. 3C and, as noted, provide an indication of whether the desired radial is to the left or right of the actual radial (but only when the actual radial is within ±9° of the desired radial). The A>B and A<B signals generated by comparators 79, 81 and 83 are used for determining which of indicators LD and RD is to be illuminated.

The A>B and A<B signals are supplied by leads L4 and L6, respectively, to a pair of AND-OR-INVERT circuits or gates 117 and 119 (FIG. 3C), each being constituted by a pair of individual AND gates and a NOR gate (like the AND-OR-INVERT gate 86 shown in FIG. 3A). The supply voltage Vcc is selectively applied to gates 117 and 119 by one section of the to-from switch 17 through resistors R2 and R3. It may also be noted that the other section of switch 17 selectively grounds either the "to" direction lights TL or the "from" direction lights FL for controlling the energization thereof by the supply voltage Vcc.

The outputs of gates 117 and 119 deliver signals which are effectively stored by a respective one of two D-type flip-flops 121 and 123. However, interconnected with the output leads L18 and L9 from gates 117 and 119 are two AND-OR circuits 125 and 127. Each of the latter circuits includes a pair of two-input NOR gates each having its output connected to one of the two inputs of another such NOR gate. Circuits 125 and 127 operate when signals are supplied by the outputs of gates G33 and G38 to inputs thereof by means of two NOR gates G61 and G62 to cause reversal of the signals supplied by leads L18 and L19. Thus, if L19 ordinarily causes a signal to be applied to the D input of flip-flop 121, then an output signal from either G33 and G38 (resulting from discontinuity detection) causes the signal to be applied instead to the D input of flip-flop 123. The same type of reversal can occur for a signal supplied by lead L18.

Clocking of flip-flops 121 and 123 for the purpose of transferring the data or signal at the respective D input thereof to the respective Q output thereof is carried out by delivery of a clocking signal supplied to the C input of these two flip-flops by a lead L21 from the output of a two-input NAND gate G64 (FIG. 3A). The Q output of flip-flop 89 is interconnected with one of the inputs of gate G64 and thus determination of the decision of whether to display the least significant digit of the desired radial or the difference between the actual and desired radials controls the delivery of the clocking signal to flip-flops 121 and 123. The data store signal delivered via a lead L22 is used to clear these flip-flops.

The Q outputs of flip-flops 121 and 123 are connected to respective two-input NAND gates G65 and G66, each having one input interconnected with a lead L23 for controlling blanking of the direction indicators LD and RD. This blanking signal is delivered by the blanking control flip-flop 115 (FIG. 3A). The outputs of gates G65 and G63 interconnect with respective conventional amplification or drivers 129 and 131 for the direction indicators LD and RD.

OPERATION

Figure 5A:
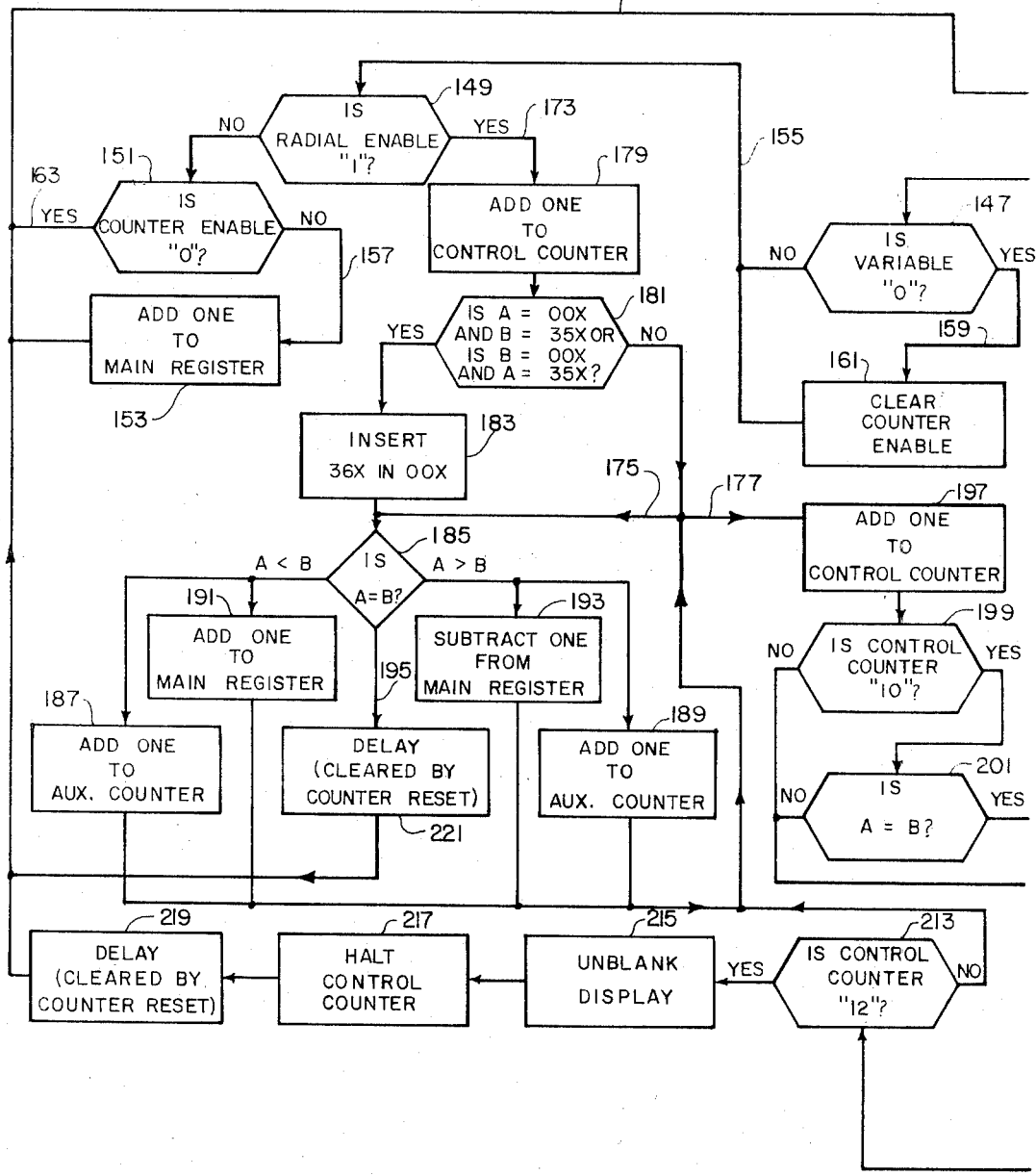
FIGS. 5A and 5B together constitute a logic diagram representing an algorithm governing operation of the apparatus, logic paths which extend between the two figures being indicated by the alignment thereof.
Figure 5B:
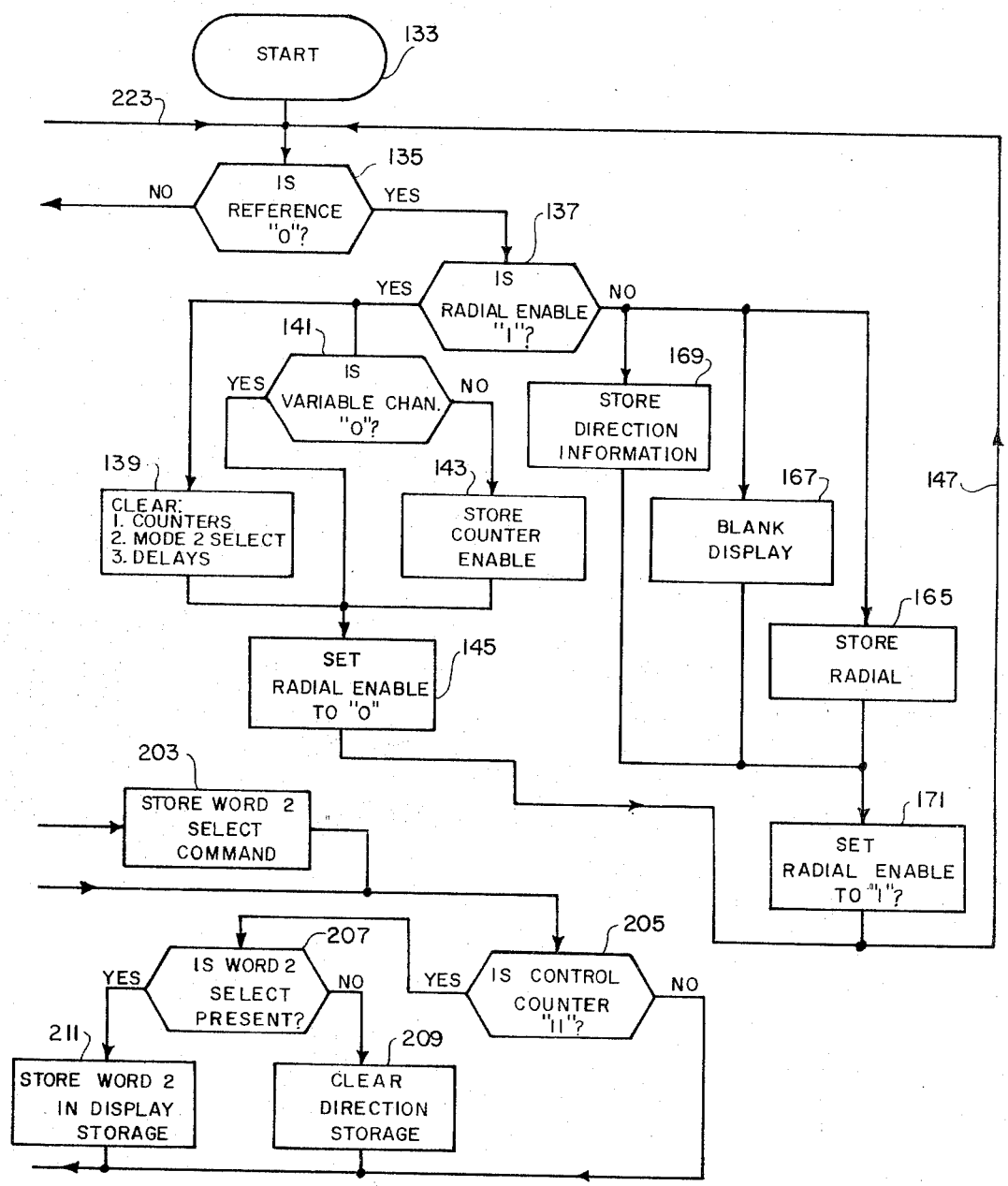

When provided with the supply voltage Vcc and the reference and variable phase signals from a VOR station, the apparatus alternates repetitively between the radial measurement cycle and the course correction cycles previously noted, each such cycle being one thirtieth of a second in duration, i.e., the period of the 30-Hz reference signal (and of also the phase signal). The apparatus can be understood by reference to the algorithm which is descriptive of its sequential operation and which is schematically represented by the logic flow diagram of FIGS. 5A–5B. Logic paths shown in FIGS. 5A and 5B may result from either sequential or simultaneous (parallel) steps of operation.

A logic step or block 133 may be regarded as the start of the several sequences of operation. Since the entire apparatus depends upon the reference signal for proper operation, a command generated when this signal crosses zero (going positive) serves to initiate these sequences. Thus, when zero-crossing detector 33 determines that the reference signal is 0 (logic step 135), then a determination is made (step 137) whether the radial measurement enable signal is present (1). If it is, the counter clear or reset signal is supplied (step 139) to the various counters, the mode decision flip-flop 89, and delay flip-flops 121 and 123.

If the radial measurement enable is present or 1 (step 141) and the variable phase signal is not 0, the counter enable signal is stored (step 143) by flip-flop 45. When zero-crossing of the variable phase signal is detected by detector 35, the radial measurement enable signal is set to 0 (step 145). These several logic steps are then repeated, a logic path 147 indicating a return to logic step 135. However, in the event that the variable phase signal and the reference phase signals are both zero, then these signals are in phase and the instruction to store a counter enable command (step 143) is bypassed.

The counter enable signal opens the clock gate (gate G3) and allows the main clock signal to be supplied ("count up") to the main register or accumulator (counters 47, 49 and 51) of the arithmetic section. The counter enable signal will be cleared at a later time by zero-crossing detector 35 of the variable phase signal channel, thereby terminating the supplying of the clock signal to the main register. The length of the time during which such clock signal gating may occur is dependent upon the relative position (i.e., bearing with respect to magnetic north) of the aircraft with respect to the VOR station. Thus, general synchronization of the apparatus and initiation of the radial measurement phase of operation is carried out. Measurement of the actual radial then begins.

Identification of the actual radial (or relative aircraft position with respect to the VOR station) results from repeated processing of a closed loop sequence comprising logic step 135 and further steps 147, 149, 151 and 153. This loop is processed once for each main clock pulse delivered by divider (counter) 63. As long as the variable phase signal is zero (this determination being represented by step 147), then subpaths represented at 155 and 157 are traversed, each such traversal representing an increase by one count of the main register (counters 47, 49 and 51). When the variable phase signal becomes zero (step 135), a subpath 159 is folowed to clear the counter enable command (clearing of the flip-flop 45 being represented by logic step 161). A subpath 163 to be followed rather than subpath 157. Such clearing of flip-flop 45 closes the clock gate G3 to prevent further incrementing of the main register. Accordingly, during the remainder of radial measurement phase, subpaths 155 and 163 are repeatedly traversed without further effect. Such continued processing after gate closure is necessary in order to accommodate the largest radial number or measurement expected, for it is not known at what portion of the processing phase of operation the variable phase signal will reach zero.

Thus far, the main register (counters 47, 49 and 51) contains a binary coded decimal number representing the actual VOR radial occupised by the aircraft. Completion of the radial measurement phase of operation results from determination of zero crossing of the reference phase signal (step 135) giving rise to traversal along the logic path to step 137.

At the completion of the radial measurement processing phase of operation, steps are taken to determine heading deviation and display mode. These steps include steps 135, 137 and additional steps 165, 167 and 169, the latter three steps defining three parallel subpaths of a logic path from step 135 to step 137 and are processed simultaneously. The purpose of each such subpath is as follows:

The subpath represented by step 165 applies a signal to the main memory control system to transfer the number present in the main register (counters 47, 49 and 51) to a storage location, viz., latches 69 and 71 and storage module 97. This retains the original radial while the main register is being adjusted to determine course deviation.

The subpath represented by step 167 applies a blanking signal to the decoders 105, 107 and 109 to prevent any radial display by course lights CL for a period sufficient to determine if it is in range of the vernier readout display VR (±9°). This decision occurs within eleven clock pulses after blanking. If the measured radial is within range of the vernier display, a mode change command causes the peripheral radial display to remain blanked. However, the multiplexer circuitry will continue to cause a course light CL to display the desired heading by steady indication thereof.

The subpath represented by step 169 illustrates the application of a signal for causing storage (in flip-flops 121 and 123) of information generated by the arithmetic section with regard to the direction of aircraft course correction. In the event of a vernier display mode decision, this information is used to drive the left or right turn direction indicators LD and RD.

The final step in this main path is to store a radial enable command and is illustrated by step 171. This establishes a processing path for the next initiation phase course deviation calculation. Calculation of course deviation begins when the radial enable signal is set to 1 (a Q output from flip-flop 43). A logic path 173 is established by the storage of a radial enable signal during the initiation phase. Prior to processing to a pair of parallel subpaths 175 and 177 which follow from path 173, the discontinuity represented by radial measurement from 359° to 0° may be considered. The present processing algorithm requires there be no discontinuity within the range of the vernier readout or display VR. This range is represented by a condition in which the actual heading is within ±9° of the desired heagin.

To prevent an error in display which could occur where the desired heading and the actual heading are both within ±10° of magnetic north, the test is made to determine if this is present. A count of one is added to control counter 87, as represented by a step 179. This test is made during the first clock pulse of this phase, as indicated by a logic block or step 181. If a potential error condition exists, the numbers three and six are inserted as indicated by a step 183 into the two most significant decades (which until then each contain the digit 0). This action moves the discontinuity out of the range of the vernier display VR and allows normal operation of the arithmetic section.

After resolution of this discontinuity test, subpaths 175 and 177 are processed simultaneously. Subpath 175 defines the main register adjustment instructions which result in a null-seeking sequence of events. Instructions from the comparators 79, 81 and 83 cause the main register to be incremented up or down, as necessary, until the main register is equal to the desired heading. The test for A = B is indicated at 185. A record of this adjustment is kept in the auxiliary counter 85, as indicated by steps 187 and 189. Incrementing of the main register in either the forward or reverse directions is indicated by steps 191 and 193, respectively. When the A = B command is given by the comparators (path 195), auxiliary counter 85 then contains a binary number representing the number of degrees course correction required by the aircraft. Subpath 177 represents a determination of whether the required correction previously stored is within range of the vernier display VR. This is accomplished by testing the main register after nine correction pulses in order to determine if it is equal to the desired heading as selected by switch register 13 by the pilot.

For this purpose, steps 197 and 199 are carried out. If A = B occurs (indicated at 201) at the tenth control counter pulse, a decision to change display modes is stored, as shown by step 203. On the eleventh control counter pulse (step 205), a signal is generated to update the vernier storage location (steps 207 and 209) and to store information (step 211) regarding display mode. On the twelfth control counter pulse (step 213), the display will be unblanked (step 215) and proper signals displayed to the pilot according to the mode information previously stored. The control counter will then halt (step 217) and all systems will remain dormant (through delay steps 219 and 221) until the beginning of the next processing phase. All delays (steps 219 and 221) are removed by the counter reset command, and the processing cycle prepares to repeat, as indicated by logic path 223 returning to the beginning step 133.

USE

In use, apparatus of the invention provides the pilot with accurate indication of the actual radial of the VOR station to which receiver 20 (FIG. 2) is tuned, by selective flashing illumination of one of the course lights CL, indicating to the nearest 10° increment the radial less than the actual radial. The least significant digit is then indicated by vernier readout VR. For example, if the apparatus calculates that the aircraft is occupying the 157° radial, the course light CL opposite the legend "150" will provide flashing illumination, while vernier readout VR will indicate the numeral 7.

In the usual mode of use, the pilot will wish to know the position of the aircraft with respect to a desired VOR radial (as during flight along so-called Victor airways mainly defined by VOR radials). Thus, the pilot may select a desired radial by positioning of selector levers 15 on the display and control panel 11 (FIG. 1). A course light CL indicates the nearest 10° radial less than that desired. Hence, for the desired radial of 185° shown selected in FIG. 1 at readout windows 16, the course light CL opposite the legend "180" will be steadily illuminated to provide the pilot with graphic representation of both actual and desired radials emanating from the VOR station for easily assimilated approximate comparison between these radials. When the aircraft is then maneuvered so that it occupies a radial within 9° of that desired, the display mode changes so that vernier readout VR now indicates the deviation in degrees between the actual and desired radials.

Also in this display mode, one of the left or right direction indicators LD or RD indicates the direction in which the aircraft course should be altered for interception of the actual radial. When the actual and desired radials coincide, vernier readout VR indicates 0. The left-right calculations which govern which of indicators LD and RD is illuminated are automatcially changed by actuation of to-from switch 17, as when the aircraft changes from "inbound" to the VOR station to an "outbound" heading. Passage over the VOR station is indicated by rapid progression or traversing of the flashing light illumination by course lights CL around the circle of such lights. Such progression of course lights CL is of special value to the pilot when flying a holding pattern, providing an easily assimilated representation of the aircraft as it travels around the usual "race track" holding pattern and provides the pilot with indication of the aircraft passing abeam the station as is desired.

It should be apparent from the foregoing that the vernier readout VR and left-right indicators LD and RD of the present display may also be used to advantage for ILS localizer indication.

Although it has not been illustrated, a self-test feature may also be incorporated for operation by the pilot by including provision for sampling of the reference phase channel, inverting (shifting by 180°) the sampled reference signal, and then supplying the inverted signal to the variable phase signal input (i.e., the input to zero-crossing detector 35), all as will be apparent to those skilled in the art. If the apparatus is operating correctly, there would then be displayed an actual radial indication of 180°.

Other additional features which are useful in VOR equipment and which are employed in the art may similarly be provided, such as means for preventing operation of the apparatus if there is insufficient signal strength of the received VOR signal.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Vhf omnirange (VOR) airborne navigation apparatus comprising:
    means for providing reference and variable phase signals from a received transmission of a predetermined VOR station, the phase difference between said signals being proportional to the actual magnetic radial with respect to said station of an aircraft receiving said transmission;
    digital phase measurement means for repetitively calculating the digital phase difference between said signals;
    display means having a generally circular indicator format and responsive to said digital phase difference for providing graphic representation of said actual radial, thereby to permit rapid pilot assimilation of aircraft position with respect to said station;
    means for manually preselecting a desired radial; and
    means for causing graphic representation by said display means also of said desired radial, thereby to permit rapid pilot assimilation of the difference between said actual and desired radials.

2. Airborne navigation apparatus as set forth in claim 1 wherein said display means has two display modes, and further comprises means for switching the display means from one display mode to the other in response to the difference between the actual and desired radials being less or more than a predetermined value.

3. Airborne navigation apparatus as set forth in claim 1 wherein said display means has two display modes and is adapted to provide coarse graphic representation of both said actual and desired radials, and further comprising vernier indicator means which in one of said display modes provides vernier indication of said actual radial.

4. Airborne navigation apparatus as set forth in claim 1 wherein said display means has two display modes and further comprises means for digitally calculating the numerical difference in degrees between said actual and desired radials, and vernier indicator means which in one of said display modes indicates said numerical difference.

5. Airborne navigation apparatus as set forth in claim 4 further comprising direction indicator means for automatically indicating the required direction in which aircraft course should be altered for interception of said desired radial.

6. Airborne navigation apparatus as set forth in claim 5 further comprising means for causing reversed direction indication of said direction indicator means according to determination of whether the aircraft is proceeding generally toward, or generally from, said station.

7. Airborne navigation apparatus as set forth in claim 6 further comprising optoelectronic indicator means for graphically representing whether said aircraft is proceeding generally toward or generally from said station.

8. Airborne navigation apparatus as set forth in claim 3 wherein said vernier indicator comprises optoelectronic numerical readout means for indicating the unit's digit of said actual radial.

9. Airborne navigation apparatus as set forth in claim 1 wherein said digital phase measurement means comprises:
an oscillator operating at a predetermined frequency;
counter means for counting in response to oscillations of said oscillator; and
switching means responsive to said reference and variable phase signals for causing counting by said counter means for a predetermined period determined by the phase difference between said signals, whereby the count of said counter means constitutes said digital phase difference.

10. Airborne navigation apparatus as set forth in claim 9 wherein said switching means comprises means for initiating said counting in response to a predetermined level of said reference signal and means for terminating said counting in response to a predetermined level of said variable phase signals.

11. Airborne navigation apparatus as set forth in claim 1 wherein said indicator format of said display means is constituted by a plurality of discrete solid state optoelectronic indicators arranged in a circle.

12. Airborne navigation apparatus as set forth in claim 3 wherein said display means comprises a plurality of discrete light sources arranged in a circle, and further comprises means for periodically energizing a selected one of said light sources to provide a flashing indication representing the actual radial, and means for selectively energizing one of said light sources to provide a visually steady light source representing the desired radial.

13. Vhf omnirange (VOR) airborne navigation apparatus comprising:
means for providing reference and variable phase signals from a received transmission of a predetermined VOR station, the phase difference between said signals being proportional to the actual magnetic radial with respect to said station of an aircraft receiving said transmission;
pulse means for providing a predetermined number of pulses per cycle of said reference signal;
counter means for counting said pulses;
switching means responsive to said signals for respectively causing counting of a number of said pulses proportional to the phase difference between said signals, said counted number constituting the digital phase difference between said signals;
selector means for manually preselecting a desired radial;
display means including a generally circular indicator format for providing rapidly assimilated graphic representation of radials; and
means, responsive to said digital phase difference and to said selector means, for causing representation by said display means of said actual and desired radials.

14. Airborne navigation apparatus as set forth in claim 13 wherein said pulse means comprises an oscillator operating at a predetermined output frequency and digital means for dividing the output frequency of said oscillator by a factor to provide pulses of a pulse repetition period corresponding to a predetermined interval of radial measurement.

15. Airborne navigation apparatus as set forth in claim 14 wherein said digital means comprises a binary counter.

16. Airborne navigation apparatus as set forth in claim 14 wherein said predetermined interval is equivalent to one degree of radial measurement.

17. Airborne navigation apparatus as set forth in claim 14 further comprising means for synchronizing operation of said digital means with said reference signal.

18. Airborne navigation apparatus as set forth in claim 13 further comprising memory means for storing the counted number of pulses for representation by said display means.

19. Airborne navigation apparatus as set forth in claim 18 wherein said counter means comprises a plurality of binary-coded-decimal counter stages and said memory means comprises a plurality of solid state latch circuits respectively interconnected with said counter stages.

20. Airborne navigation apparatus as set forth in claim 18 wherein said display means has two display modes, and which further comprises calculating means for digitally calculating the difference between the stored number of pulses and a number representative of the desired radial, and vernier indicator means responsive in one of said modes to said difference between said stored number and said representative number for indicating the difference between said actual and desired radials.

21. Airborne navigation apparatus as set forth in claim 20 wherein said calculating means includes comparator means for determining whether said difference is less or greater than a predetermined value and said vernier indicator means is adapted in said one mode to display said difference if less than said predetermined value.

22. Airborne navigation apparatus as set forth in claim 21 wherein said vernier indicator means is adapted in the other of said modes to display the unit's digit of said stored number if said difference is greater than said predetermined value.

23. Airborne navigation apparatus as set forth in claim 22 wherein said vernier indicator means comprises an optoelectronic numeric readout.

24. Airborne navigation apparatus as set forth in claim 22 wherein said optoelectronic readout comprises an LED display.

25. Airborne navigation apparatus as set forth in claim 22 wherein said comparison means comprises:
- a digital counter; and
- null-seeking means for causing said counter means to count until the count accumulated therein is equal to the number representative of the desired radial, said digital counter storing the number of counts required to cause said equaling.

26. Airborne navigation apparatus as set forth in claim 25 wherein the number representative of the desired radial is from zero through 359°.

27. Airborne navigation apparatus as set forth in claim 26 further comprising discontinuity compensating means for preventing erroneous operation of the first said counter means in response to operation of said null-seeking means when counting past the discontinuity between zero and 359°.

28. Airborne navigation apparatus as set forth in claim 27 wherein said discontinuity compensating means comprises:
- decoder means for decoding both a predetermined value of the number representative of the desired radial and a predetermined value of said stored number; and
- means for causing a predetermined number to be inserted in the first said counter means in response to said decoded predetermined values.

29. Airborne navigation apparatus as set forth in claim 20 wherein said indicator format of said display means is constituted by a plurality of LED's arranged in a circle.

30. Airborne navigation apparatus as set forth in claim 29 wherein said vernier indicator means comprises an optoelectronic numeric readout positioned within said circle of LED's.

31. Airborne navigation apparatus as set forth in claim 30 further comprising means, including a pair of optoelectronic direction indicator devices, for automatically determining and indicating in said one display mode the required direction left or right in which aircraft course should be altered for interception of said desired radial.

32. Airborne navigation apparatus as set forth in claim 29 further comprising decoder-driver means for decoding the stored number in said memory means and selectively driving said LED's in accordance with the decoded number.

33. Airborne navigation apparatus as set forth in claim 32 further comprising a multiplexer for causing said decoder-driver means to alternate between decoding of the stored number and said number representative of said desired radial.

34. The method of displaying vhf omnirange (VOR) radials comprising:
- receiving a transmission from a predetermined VOR station;
- providing reference and variable phase signals from said received transmission, the phase difference between said signals being proportional to the actual magnetic radial with respect to said station of an aircraft receiving said transmission;
- generating a periodically varying signal having a period having a predetermined correspondence to that of said reference signal;
- repetitively counting the number of periodic variations of said periodically varying signal for an interval corresponding to the phase difference between said reference and variable signals whereby the counted number is a numerical representation of said actual radial;
- storing the counted number;
- decoding the counted number;
- graphically representing on a generally circular indicator said actual radial with respect to a VOR station in accordance with the decoded number thereby to permit rapid pilot assimilation of aircraft position with respect to the VOR station;
- preselecting a desired radial; and
- graphically representing on said generally circular indicator said desired radial with respect to the VOR station thereby to permit rapid pilot assimilation of the difference between said actual and desired radials.

35. The method as set forth in claim 34 in which two display modes are provided and wherein said actual radial is coarsely graphically represented by its two more significant digits on said indicator and further comprising the step of providing in one of said modes vernier numerical representation of the unit's digit of said actual radial.

36. The method as set forth in claim 35 which further includes:
- numerically comparing said actual and desired radials; and
- providing vernier representation in the other of said display modes of the numerical difference between said actual and desired radials.

37. The method as set forth in claim 36 further comprising:
- determining whether or not said actual radial is within a predetermined number of degrees of said desired radial;
- providing said vernier representation of said numerical difference only if said actual radial is within said predetermined number of degrees of said desired radial; and
- providing vernier representation of said actual radial when not within said predetermined number of degrees of said desired radial.

38. Airborne nagivation apparatus as set forth in claim 5 wherein said display means comprises a plurality of discrete light sources arranged in a circle, and wherein only one visually steady light source is energized to provide a single visually steady light source when the difference between said actual and desired radials is less than a predetermined value, and which includes means for deenergizing said direction indicator means when said actual and desired radials coincide.

* * * * *